United States Patent
Kotwicki

(10) Patent No.: US 6,259,986 B1
(45) Date of Patent: Jul. 10, 2001

(54) METHOD FOR CONTROLLING AN INTERNAL COMBUSTION ENGINE

(75) Inventor: Allan Joseph Kotwicki, Williamsburg, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/523,676

(22) Filed: Mar. 10, 2000

(51) Int. Cl.$^7$ ................................ F02D 41/14; F02P 5/15
(52) U.S. Cl. .................. 701/161.6; 701/103; 477/54; 477/113; 477/181; 477/73; 477/1.09
(58) Field of Search .................... 701/101–103, 701/110, 115; 477/54, 113, 181; 73/1.09, 1.11

(56) References Cited

U.S. PATENT DOCUMENTS

| | | |
|---|---|---|
| 4,139,892 | 2/1979 | Gudea et al. . |
| 4,492,195 | 1/1985 | Takahashi et al. . |
| 4,721,083 | 1/1988 | Hosaka . |
| 4,976,589 | 12/1990 | Ide . |
| 5,163,399 | 11/1992 | Bolander et al. . |
| 5,184,527 * | 2/1993 | Nakamura ..................... 701/101 |
| 5,241,855 | 9/1993 | Cullen et al. . |
| 5,245,966 | 9/1993 | Zhang et al. . |
| 5,319,555 | 6/1994 | Iwaki et al. . |
| 5,483,820 | 1/1996 | Nakamoto et al. . |
| 5,692,988 | 12/1997 | Beim et al. . |
| 5,752,387 | 5/1998 | Inagaki et al. . |
| 5,826,208 | 10/1998 | Kuroiwa et al. . |
| 5,910,176 | 6/1999 | Creger . |
| 5,924,296 | 7/1999 | Takano et al. . |
| 5,938,712 | 8/1999 | Ibamoto et al. . |

OTHER PUBLICATIONS

SAE Paper #660368, "Torque Converter as a Vibrator Damper and its Transient Characteristics", T. Ishihara, R.I. Emori, Mid–Year Meeting, Detroit, MI, Jun. 6–10, 1996, pp. 1–13.

SAE Paper #820393, "Dynamic Models for Torque Converter Equipped Vehicles", A.J. Kotwicki, Electronic Engine Management and Driveline Controls P–104, pp. 103–117 Feb., 1982.

ISATA Paper #84041, Proceedings, vol. 1, "The Inertia collection System Utilization In Modern Engine Research And Supervision", Lars Th. Collin, Chalmers University of Technology, Sweden, pp. 669–689.

* cited by examiner

Primary Examiner—Andrew M. Dolinar
(74) Attorney, Agent, or Firm—John D. Russell; Julia Voutyras

(57) ABSTRACT

A method is presented for controlling powertrain torque by minimizing the error between the actual powertrain torque (as read by the torque sensor) and the desired powertrain torque (as requested by the vehicle driver). Since torque sensors are known to drift under certain conditions, such as high ambient temperature, the output of the torque sensor is adjusted by an offset value. This offset value is determined by reading the torque sensor output when the speed ratio (engine speed/turbine speed) is substantially unity, and the net torque at the torque converter is substantially zero. This adjusted output is then filtered to avoid abrupt fluctuations in the powertrain torque, and used to improve powertrain control so that better drive feel and increased fuel economy can be achieved.

21 Claims, 4 Drawing Sheets

METHOD FOR CONTROLLING AN INTERNAL COMBUSTION ENGINE

FIELD OF THE INVENTION

The field of the invention relates to a method for controlling a vehicle powertrain having a torque sensor by adjusting torque in response to the information provided by the torque sensor.

BACKGROUND OF THE INVENTION

Vehicles driven by an internal combustion engine having a torque converter and an automatic transmission have used a torque sensor. The output of the torque sensor can be used to control engine or transmission performance. A number of approaches have been proposed for utilizing the engine torque sensor signal to achieve improved powertrain control. One such method is described in U.S. Pat. No. 5,319,555. Using the engine torque sensor output signal, vehicle driving resistance can be calculated with high precision. This information is then used to determine the most appropriate transmission gear ratio for various driving conditions such as hill climbing. In other words, transmission performance can be improved by using the output signal of the engine torque sensor.

The inventors herein have recognized a disadvantage with this approach. A typical torque sensor is usually a piezo-electric or a magnetostrictive device, which has a tendency to drift under certain operating conditions. For example, changes in ambient temperature may cause errors in the output signal values. Such errors are especially significant near very low engine torque levels such as those experienced in idle conditions. These errors lead to degraded engine control and cause reduced fuel economy and degradation in drive feel and vehicle performance. In other words, when the output signal of the engine torque sensor is not representative of the actual engine torque, engine performance optimization is degraded.

SUMMARY OF THE INVENTION

An object of the present invention is to provide a method for controlling engine torque by using the output signal of a torque sensor.

The object of the invention is achieved and disadvantages of prior approaches overcome by a method for controlling torque of a powertrain coupled to a torque sensor. The method comprises indicating when the powertrain torque is substantially zero, in response to said indication, correcting an output signal of the torque sensor, and controlling the powertrain torque in response to said corrected torque sensor output signal.

An advantage of the above aspect of the invention is that a more precise value of torque can be determined from the torque sensor and, therefore, better engine and transmission control can be achieved. These improvements will contribute to improved drive feel, vehicle performance, and fuel economy.

In another aspect of the present invention, the object is achieved and disadvantages of prior approaches overcome by a method for controlling torque of a powertrain coupled to a torque sensor where the powertrain has a torque converter. The method comprises determining desired powertrain torque based on an operator command, indicating when speed ratio across the torque converter is substantially unity, in response to said indication, correcting an output signal of the torque sensor, filtering said corrected powertrain torque sensor output signal, and controlling the powertrain in response to said filtered corrected powertrain torque sensor output signal and said desired powertrain torque.

An advantage of the above aspect of the invention is that it is possible to correct offsets in the torque sensor. Further, by filtering these corrections, it is possible to prevent abrupt changes in measured actual torque. Thus, is it possible to provide smooth powertrain control even when correcting for offsets. These improvements will further contribute to improved drive feel, vehicle performance, and fuel economy.

Other objects, features and advantages of the present invention will be readily appreciated by the reader of this specification.

DESCRIPTION OF THE DRAWINGS

The object and advantages of the invention claimed herein will be more readily understood by reading an example of an embodiment in which the following invention is used to advantage with reference to the following drawings herein:

DESCRIPTION OF THE INVENTION

Figure 1:
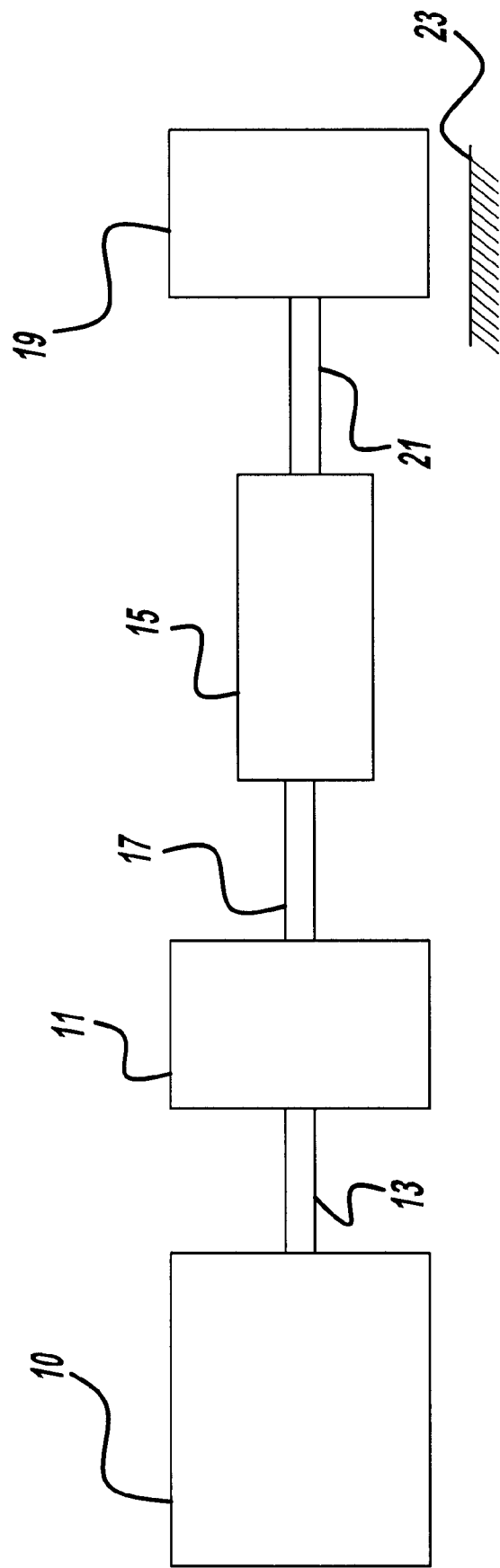
FIG. 1 is a block diagram of a vehicle powertrain illustrating various components related to the present invention.
Figure 2:
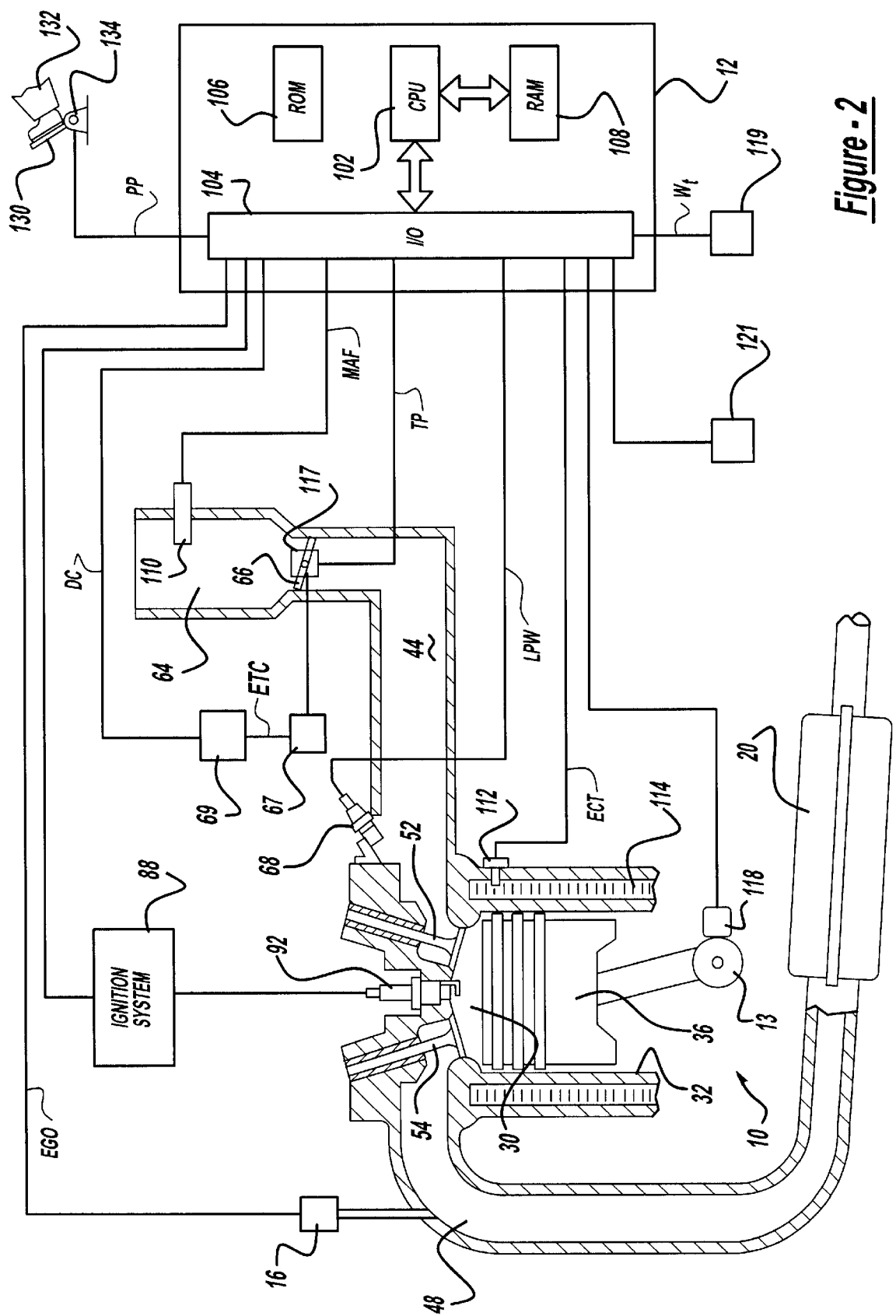
FIG. 2 is a block diagram of an engine in which the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17 which is also known as a transmission input shaft. Torque converter 11 has a bypass clutch (not shown) which can be engaged, disengaged, or partially engaged. When bypass clutch is either disengaged or partially engaged, torque converter 11 is said to be in an unlocked state. Transmission 15 is an electronically controlled transmission with a plurality of selectable discrete gear ratios. Transmission 15 also includes various other gears such as, for example, a final drive ratio (not shown). Transmission 15 is also coupled to tire 19 via axle 21. Tire 19 interfaces the vehicle (not shown) to the road 23. In an alternative embodiment for use with manually shifted vehicles, transmission 15 can be replaced with a manual transmission and torque converter 11 can be deleted.

Internal combustion engine 10, having a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (We). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
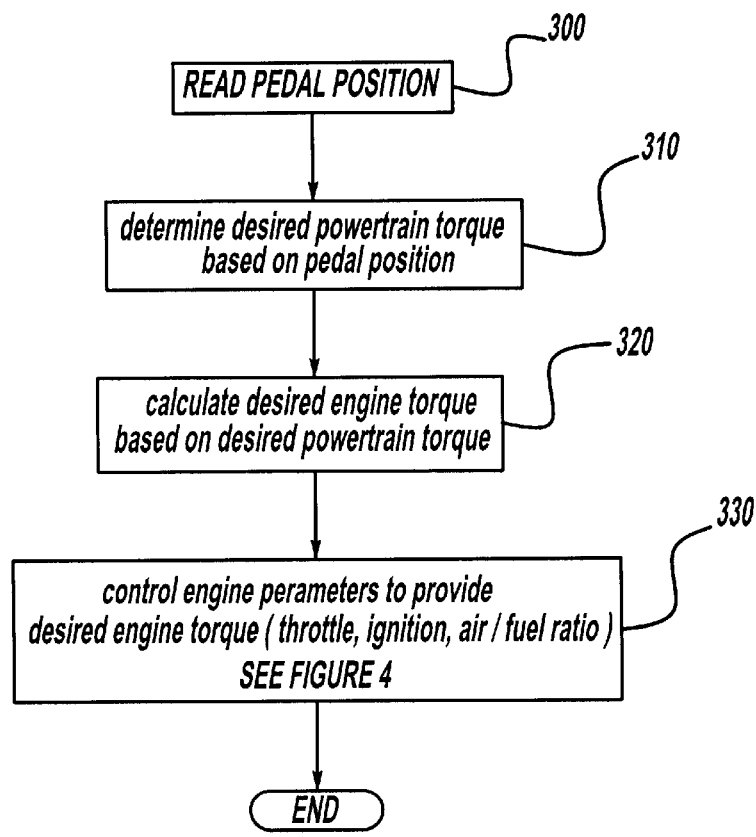
FIGS. 3, 4, and 5 are block diagrams of embodiments in which the invention is used to advantage.
Figure 4:
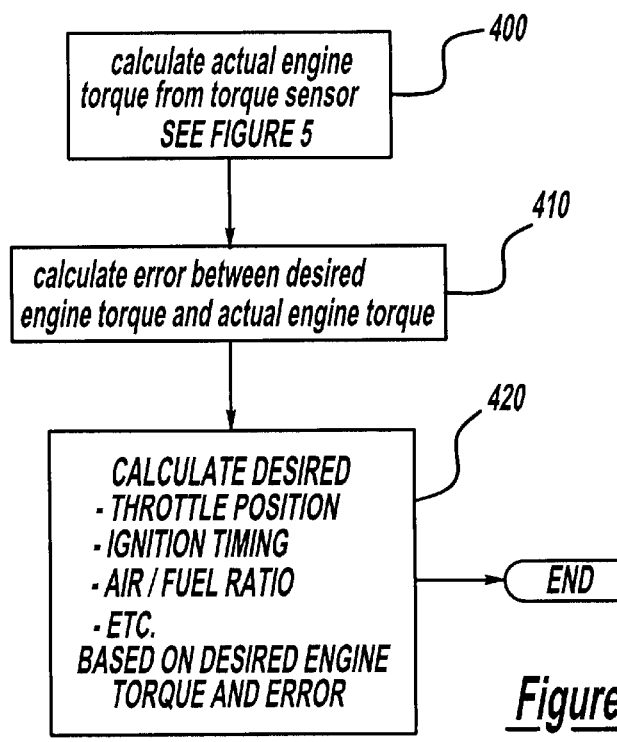

Referring now to FIG. 3, a routine is described for controlling engine parameters to provide desired engine torque. First, in step 300, pedal position is determined from the pedal position sensor. Next, in step 310, desired powertrain torque is determined based on the pedal position. In step 320, desired engine torque is calculated based on desired powertrain torque. For example, if a desired wheel torque is determined from the pedal position, then gear ratio and torque ratio across the torque converter are used to calculate desired engine torque. Then, in step 330, a routine is performed wherein engine parameters such as throttle position, ignition timing and air/fuel ratio are controlled to provide desired engine torque. This control routine in step 330 is described in further detail in FIG. 4. First, in step 400, a routine for calculating actual engine torque, $T_{corr\_torque}$, from the torque sensor is performed. Next, in step 410, the error between desired engine torque and actual engine torque is calculated. Then, in step 420, desired engine parameters such as throttle position, air/fuel ratio, ignition timing are calculated based on desired engine torque and the error calculated in step 410. In other words, a combined feed-back and feed-forward control architecture is used to control engine torque to a desired level. Those skilled in the art will recognize, in view of this disclosure, that such a torque control architecture can be modified to accommodate any placement of the torque sensor. For example, the torque sensor may be placed on the engine output as shown in FIG. 1, torque converter input or output, or transmission input or output.

Figure 5:
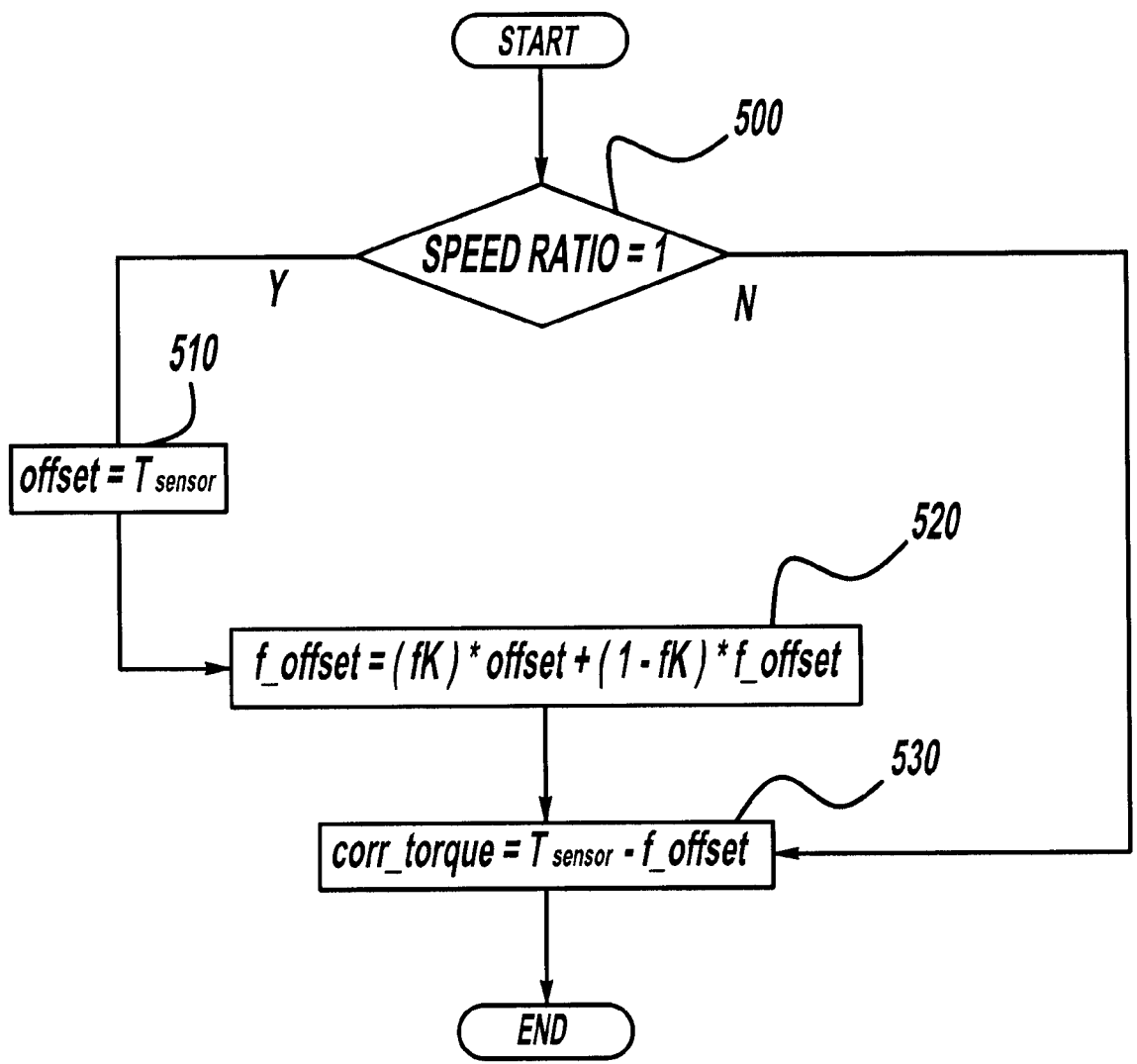

Moving on to FIG. 5, a routine for calculating actual engine torque from the torque sensor is described in detail. First, in step 500, a determination is made whether the speed ratio (turbine speed/engine speed) across the torque converter is substantially equal to one. This is done, for example, by determining whether the speed ratio is within a predetermined range such as 0.95 and 1.05 when the torque converter is unlocked. In an alternative embodiment, a determination is made whether the transmission is in a neutral state and engine speed is substantially constant. Stated another way, a determination is made in step 500 as to whether net engine torque, or net powertrain torque, is substantially zero. When speed ratio across the torque converter is substantially unity and the torque converter is unlocked, or when slip between input and output speeds is substantially zero, this is an indication that powertrain torque is substantially zero. Further, when the transmission is in neutral, i.e., no coupling between engine and transmission, and when engine speed is substantially constant, this also is an indication that powertrain torque is substantially zero.

In an alternative embodiment, a determination can be made whether a transmission overrunning clutch becomes engaged to prevent engine braking. Engine braking is prevented by an overrunning clutch that produces a one-way drive connection between a gear unit and a nonrotating powertrain member, such as transmission casing. The overrunning clutch is engaged when the wheel speed becomes greater than the engine speed by a small preselected tolerance amount. When the overrunning clutch becomes engaged, engine braking is prevented. The point at which the overrunning clutch becomes engaged, i.e., a connection is made between a gear unit and a nonrotating member, is the point at which net torque is transitioning from positive to negative. At that point, net torque across the torque converter is essentially zero.

Continuing with FIG. 5, if the answer to step 500 is YES, the routine proceeds to step 510 wherein the offset is set to be equal to the output of the torque sensor:

offset=$T_{sensor}$

Then, in step 520, a filtered value of the offset, f_offset, is calculated according to the following equation:

f_offset=$(fk)$*offset+$(1-fk)$*f_offset, where fk is a filtering coefficient. The filtering coefficient can be selected so that smooth engine control is provided when a change in offset is detected. The routine then proceeds to step 530 wherein corrected torque, $T_{corr\_torque}$, is calculated based on the following equation:

$T_{corr\_torque}=T_{sensor}-$f_offset.

If the answer to step 500 is NO, the routine proceeds to step 530 described above.

Thus, it is possible to eliminate the effects of the torque sensor drift by re-zeroing the torque sensor every time the speed ratio (engine speed/turbine speed) is substantially unity, and to use the corrected result to achieve better powertrain control. Those skilled in the art will recognize, in view of this disclosure, that torque sensor 121 can be placed on several different areas of the powertrain, such as the engine output as shown in FIG. 1, torque converter input or output, or transmission input or output. Irrespective of torque sensor location, and according to the present invention, it is possible to correct the torque sensor output to compensate for zero drifts.

This concludes the description of the invention. The reading of it by those skilled in the art would bring to mind many alterations and modifications without departing from the spirit and the scope of the invention. For example, the present invention may be used with both port fuel injected engine and direct injected engine, stoichiometric engines or lean-burn engines, or gasoline engines or diesel engines. Accordingly, it is intended that the scope of the invention is defined by the following claims.

What is claimed is:

1. A method for controlling torque of a powertrain coupled to a torque sensor, the method comprising:

indicating when the powertrain torque is substantially zero;

in response to said indication, correcting an output signal of the torque sensor; and controlling the powertrain torque in response to said corrected torque sensor output signal.

2. The method recited in claim 1 wherein the powertrain further includes a torque converter, wherein said step of indicating when said powertrain torque is substantially zero comprises indicating when speed ratio across said torque converter is substantially unity.

3. The method recited in claim 1 wherein the powertrain includes a transmission, wherein said step of indicating when said powertrain torque is substantially zero comprises indicating when said vehicle transmission is in a neutral idle state.

4. The method recited in claim 1 wherein the powertrain further includes an overrunning clutch, wherein said step of indicating when said powertrain torque is substantially zero comprises indicating when said overrunning clutch first becomes engaged.

5. The method recited in claim 1 wherein said step of controlling said powertrain torque comprises controlling air/fuel mixture of an engine.

6. The method recited in claim 1 wherein said step of controlling the powertrain torque comprises controlling spark advance of an engine.

7. The method recited in claim 1 further comprising filtering said corrected powertrain torque sensor output signal to prevent abrupt fluctuations in the powertrain torque.

8. A method for controlling torque of a powertrain coupled to a torque sensor, the powertrain having a torque converter, the method comprising:

indicating when speed ratio across the torque converter is substantially unity;

in response to said indication, correcting an output signal of the torque sensor; and controlling the powertrain torque in response to said corrected torque sensor output signal.

9. The method recited in claim 8 wherein said step of controlling the powertrain torque comprises controlling throttle valve position of an engine.

10. The method recited in claim 8 wherein said step of controlling the powertrain torque comprises controlling air/fuel mixture of an engine.

11. The method recited in claim 8 wherein said step of controlling the powertrain torque comprises controlling spark advance of an engine.

12. The method recited in claim 8 further comprising filtering said corrected torque sensor output signal to prevent abrupt fluctuations in the powertrain torque.

13. A method for controlling torque of a powertrain coupled to a torque sensor, the powertrain having a torque converter, the method comprising:

indicating when the powertrain is in a neutral idle state;

in response to said indication, correcting an output signal of the torque sensor; and controlling the powertrain torque in response to said corrected torque sensor output signal.

14. The method recited in claim 13 wherein said step of controlling the powertrain torque comprises controlling throttle valve position of an engine.

15. The method recited in claim 13 wherein said step of controlling the powertrain torque comprises controlling air/fuel mixture of an engine.

16. The method recited in claim 13 wherein said step of controlling the powertrain torque comprises controlling spark advance of an engine.

17. The method recited in claim 13 further comprising filtering said corrected torque sensor output signal to prevent abrupt fluctuations in the powertrain torque.

18. A method for controlling torque of a powertrain coupled to a torque sensor, the powertrain having a torque converter, the method comprising:

determining desired powertrain torque based on an operator command;

indicating when speed ratio across the torque converter is substantially unity;

in response to said indication, correcting an output signal of the torque sensor;

filtering said corrected powertrain torque sensor output signal; and controlling said powertrain in response to said filtered corrected powertrain torque sensor output signal and said desired powertrain torque.

19. The method recited in claim 18 wherein operator command is a pedal position.

20. The method recited in claim 19 wherein said step of controlling the powertrain further comprises controlling engine torque.

21. An article of manufacture comprising:

a computer storage medium having a computer program encoded therein for use with a powertrain coupled to a torque sensor, the powertrain having a torque converter, said computer medium comprising:

code for determining desired powertrain torque based on operator command;

code for indicating when speed ratio across the torque converter is substantially unity;

code for correcting an output signal of the torque sensor in response to such indication;

code for filtering said corrected torque sensor output signal; and code for controlling the powertrain torque in response to said filtered corrected torque sensor output signal and said desired powertrain torque.

* * * * *